Patented Aug. 5, 1924.

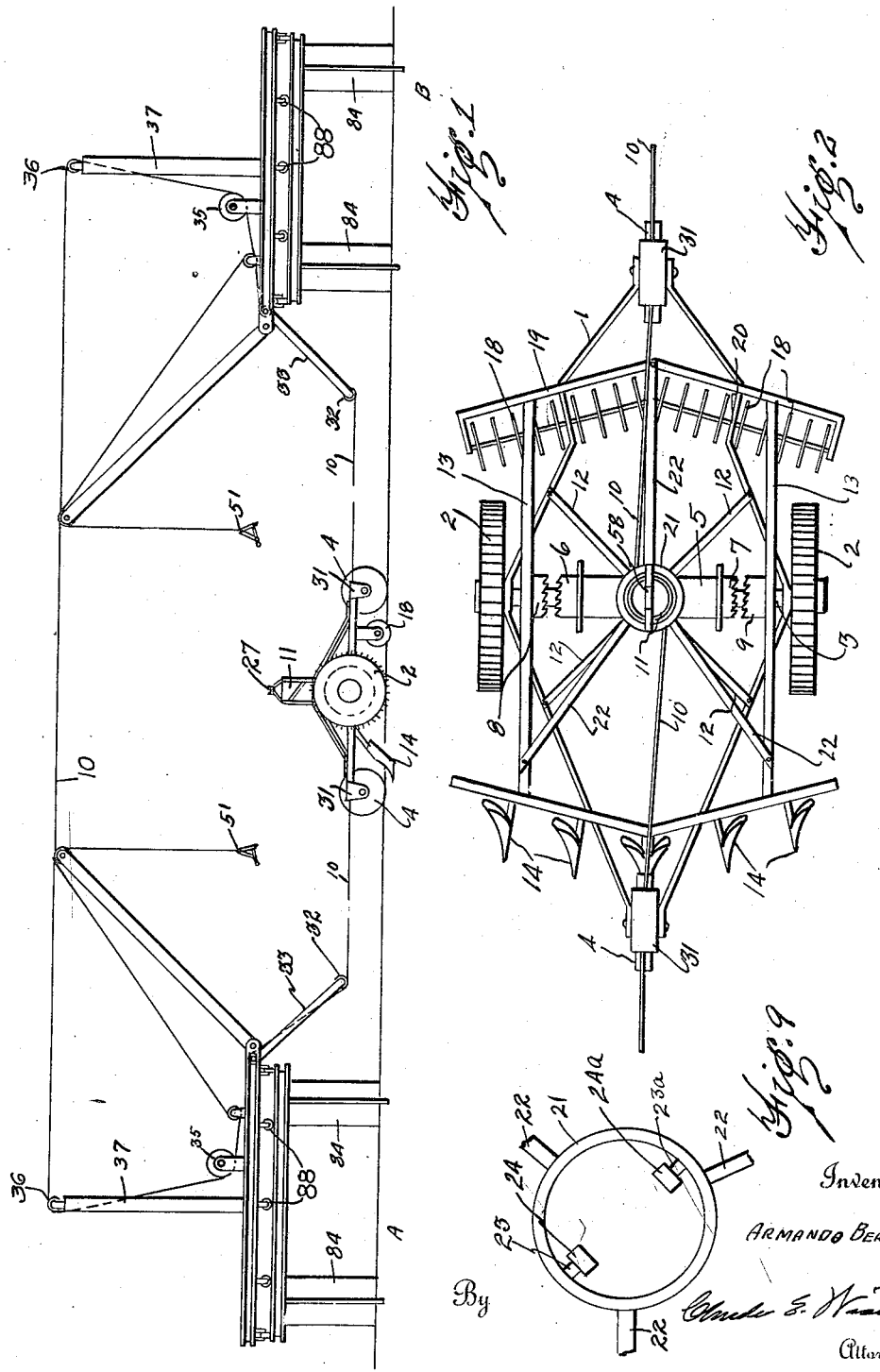

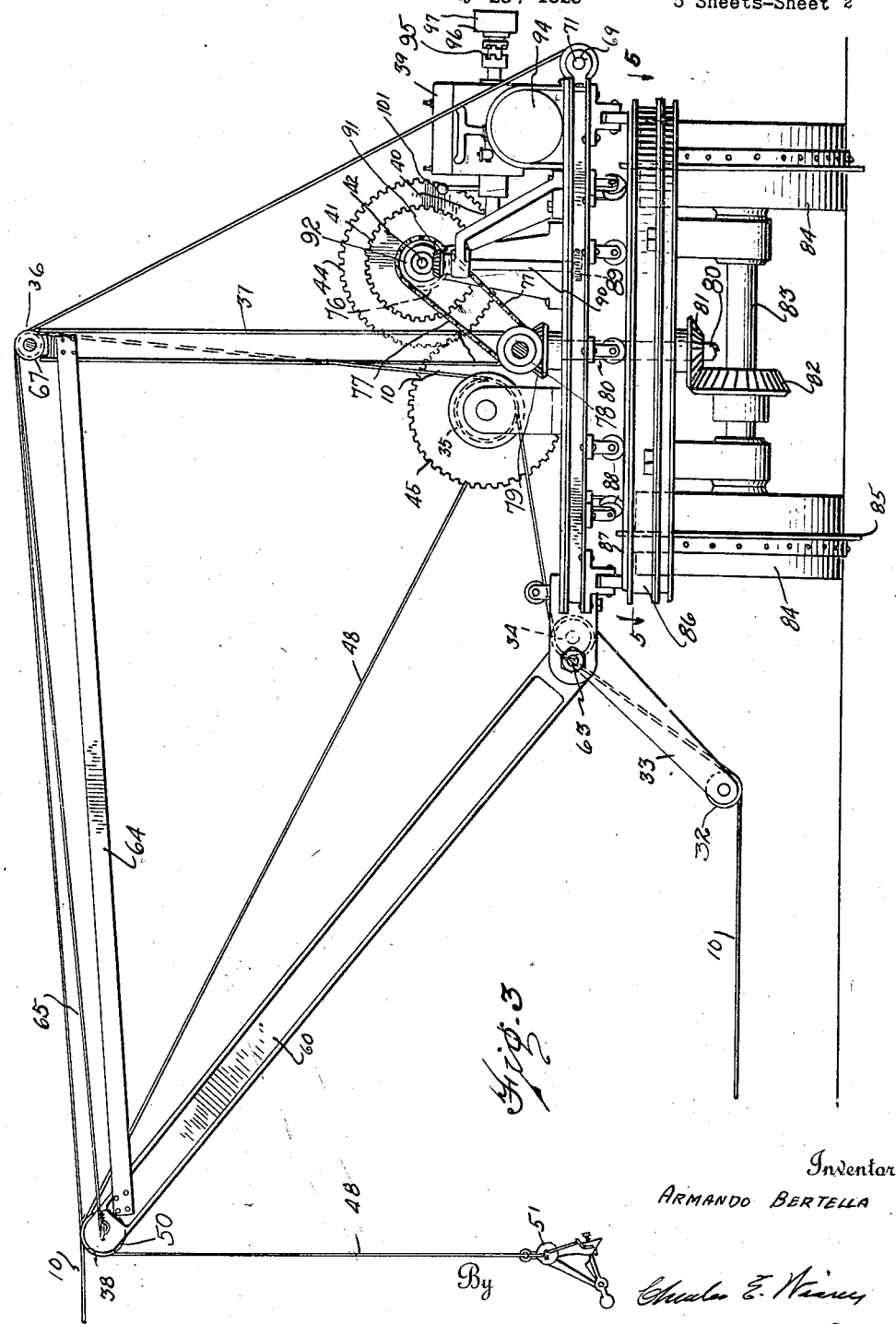

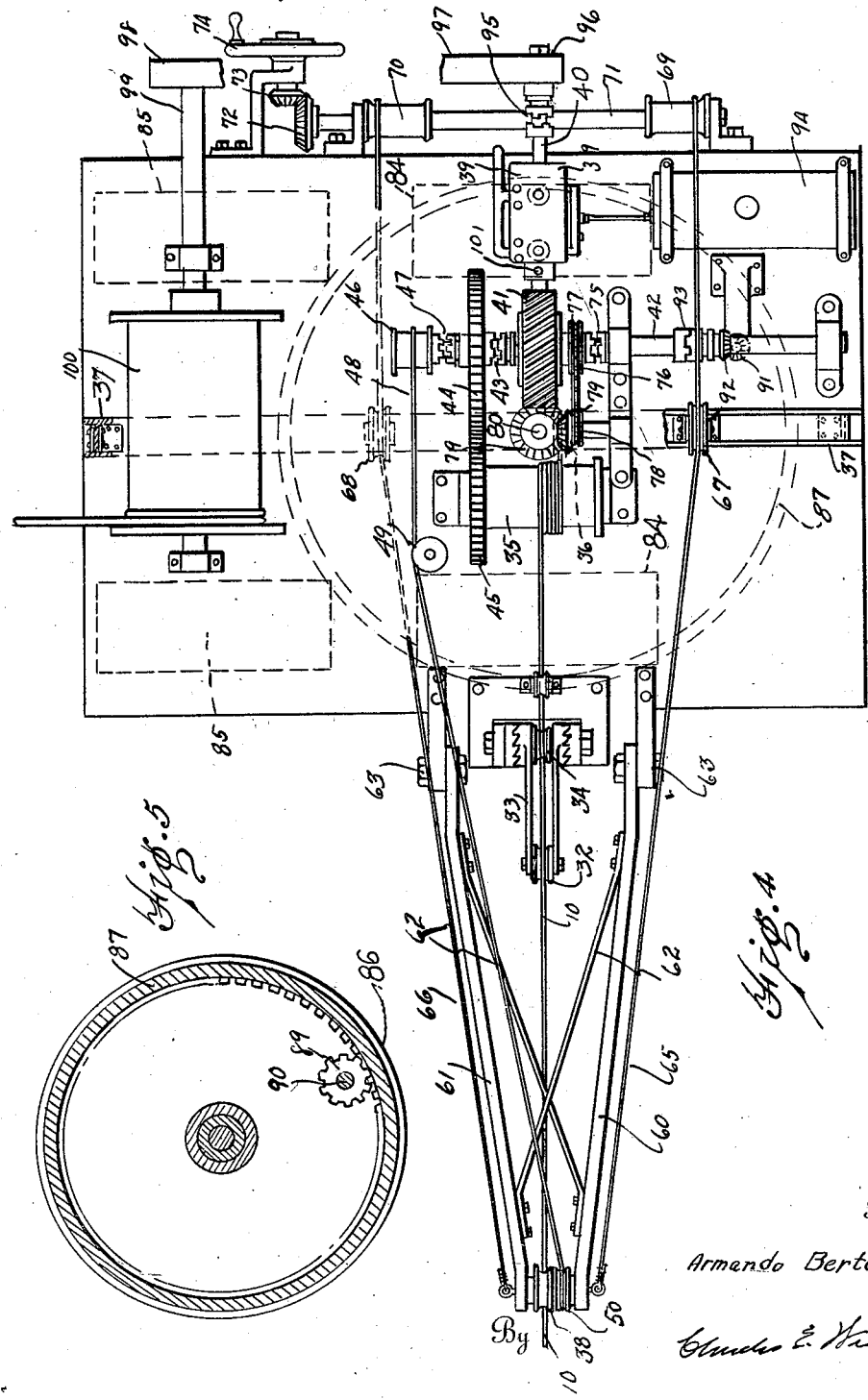

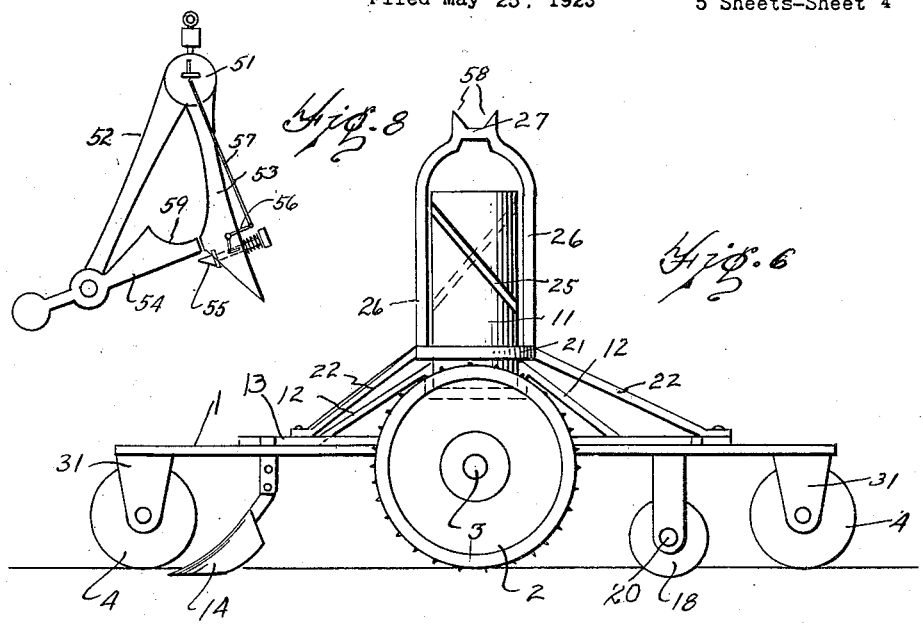
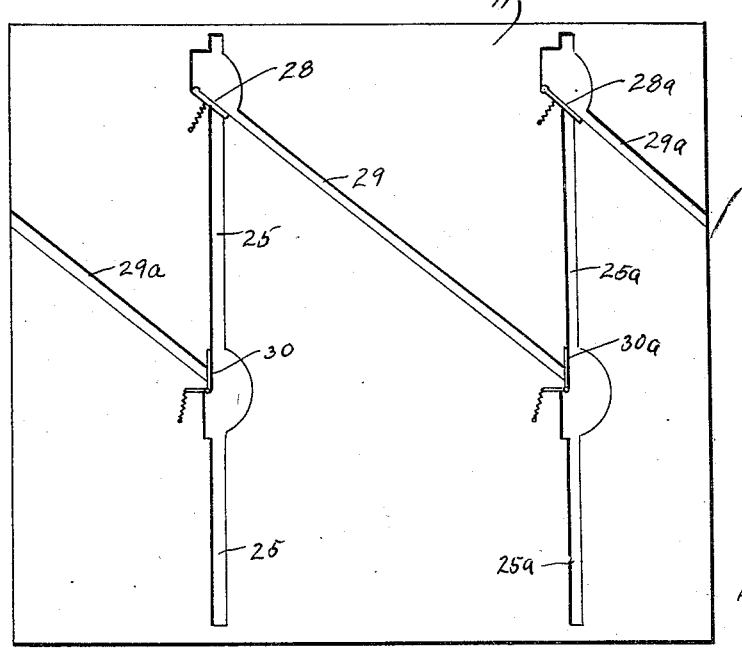

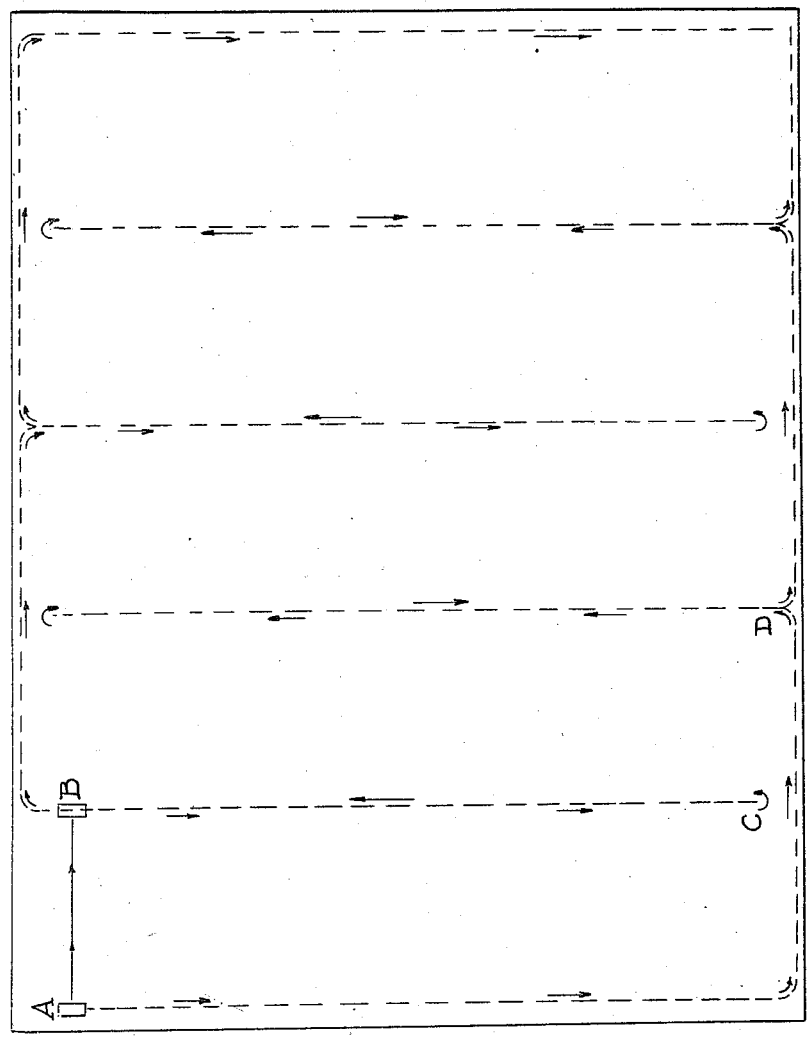

1,503,467

UNITED STATES PATENT OFFICE.

ARMANDO BERTELLA, OF DETROIT, MICHIGAN.

CABLE-OPERATED PLOW.

Application filed May 25, 1923. Serial No. 641,370.

*To all whom it may concern:*

Be it known that I, ARMANDO BERTELLA, a subject of the King of Italy, residing at Detroit, county of Wayne, State of Michigan, have invented a certain new and useful Improvement in Cable-Operated Plows, and declare the following to be a full, clear, and exact description of the same, such as will enable others skilled in the art to which it pertains to make and use the same, reference being had to the accompanying drawings, which form a part of this specification.

This invention relates to cable operated plows, and the object of the invention is to provide a gang plow adapted to be drawn back and forth by means of a cable extending between two draft machines either machine being adapted to take up the cable and draw the plow. Another object of the invention is to provide a gang plow comprising a chassis on which the wheels are mounted and a frame on which the plows are mounted, the frame being adapted to be turned on the chassis to reverse the plows at the beginning of each movement across the ground between the operating machines. Another object of the invention is to provide a pair of draft machines for the plow each provided with a driving mechanism whereby the machines may be moved after each strip of soil has been plowed. A further object of the invention is to provide a mechanism for turning the plows after plowing each strip of land. Another object of the invention is to provide a draft machine for the plow which may be turned to draw the plow from any direction and provided with a crane by means of which the plows may be lifted for turning or by which the plows may be carried from one field to another. Another object of the invention is to provide a plow adapted to be utilized with two draft machines, the plow being connected to the two machines by means of a continuous cable and means being provided on the plow for taking up any slack in the cable. These objects and the several novel features of the invention are hereinafter more fully described and claimed and the preferred form of construction by which these objects are attained is shown in the accompanying drawings in which—

Fig. 1 is an elevation of the entire mechanism as set up for plowing a field.

Fig. 2 is a plan view of the gang plow.

Fig. 3 is a side elevation of one of the draft machines.

Fig. 4 is a plan view thereof.

Fig. 5 is a section taken on line 5—5 of Fig. 3.

Fig. 6 is a side elevation of the plow and carrier.

Fig. 7 is a development of the guide means for reversing the plow.

Fig. 8 is a side elevation of the hook for lifting the plow.

Fig. 9 is a plan view of the means for turning the plow frame.

Fig. 10 is a plan view of a field as laid out for plowing.

As shown in Fig. 2 the plow comprises a diamond shaped subframe 1 having a pair of wheels 2 connected by an axle 3. At each end of the frame 1 is a guide wheel 4 and a drum 5 is rotatably mounted on the central axle the drum being provided with opposite clutch members 6 and 7 on the opposite ends thereof adapted to be brought to engagement with companion clutch members 8 and 9 secured to the frame 1 and in which the axle 2 is rotatable. The opposite ends of the cable 10 are passed through guides on each end of the subframe 1 and are secured to opposite sides of the drum 5, and, by turning this drum 5 any slack in the cable may be taken up at which time the clutch member 6 may be engaged in the clutch member 8 or the clutch member 7 may be engaged in the clutch member 9 to prevent reverse rotation of the drum depending on the direction in which the drum has been wound up. A tube 11 of large diameter is supported on the subframe 1 by means of the supporting members 12 shown more particularly in Figs. 2 and 6. A plow frame 13 is positoned over and rests on the subframe 1 and carries a series of plows 14 at the forward end thereof and a series of disc harrows 18 at the rear end thereof which are rotatably mounted on the shafts 19 and 20. A ring 21 is supported on the plow frame 13 by means of three members 22. This ring, as shown in Fig. 9, is provided with a pair of radially extending lugs 23 and 23$^a$ on which small rollers 24 and 24$^a$ are rotatably mounted. The roller 24 normally seats in the slot 25 shown in Fig. 7 which shows the tube 11 laid out flat and the roller 24$^a$ normally seats in the slot 25$^a$.

Secured to the ring 21 is a yoke 26 which extends up over the tube 11 and is provided with a cross member 27 at the upper end thereof, the member 27 providing a means by which the yoke 26, ring 21 and frame 13 may be lifted. As these parts are lifted the rollers 24 and 24ª travel upwardly in the slots 25 and 25ª thus raising the spring latches 28 and 28ª which allows the rollers to travel into the upper ends of the respective slots at which time the latches 28 and 28ª take the position shown in full lines in Fig. 7 by means of the small coiled springs. As the yoke, ring 21 and frame 13 are subsequently lowered the rollers 24 and 24ª travel down the inclined grooves 29 and 29ª and open the spring retaining latches 30 and 30ª and drop back into the bottom of the slots 25 and 25ª, the roller 24ª at this time being in the bottom of the slot 25 and the roller 24 being in the bottom of the slot 25ª. By this arrangement the frame 13 with the plows and disc harrows is given a half turn and is reversed for plowing in the opposite direction without turning the subframe 1. The cable 10 leads from the drum 5 in opposite directions and passes through the guide members 31 on each end of the subframe 1 and passes over rollers 32 each rotatably supported in the end of an arm 33 which is adjustably supported on a table 34 of each draft machine, there being two such machines provided as shown in Fig. 1. This arm 33 as shown in Figs. 3 and 4 is also provided with a pulley 34 over which the cable 10 passes, the cable continuing from the pulley 34 about a drum 35 and being wound several times about the drum in order to tightly grip the same as shown in Fig. 4. The cable passes upwardly from the drum over a pulley 36 mounted on an inverted U shaped frame member 37 shown more particularly in Figs. 3 and 4. The cable passes from the pulley 36 over a pulley 38 shown in Figs. 3 and 4 and extends across and enters the other draft machine in the same manner, the two machines being exact duplicates. The cable 10 is driven by means of a prime mover such as an electric motor, steam engine or internal combustion engine 39 shown in Figs. 3 and 4. The shaft 40 of the prime mover is provided with a worm meshing with a worm gear 41 which is adapted to drive a shaft 42. The shaft 42, shown in Fig. 4, is provided with a clutch 43 by means of which the gear 44 may be driven or allowed to rotate idly on the shaft 42. The gear 44 meshes with the gear 45 secured to the drum 35 and by operation of the clutch 43 the drum 35 may be driven or stopped at will. On one end of the shaft 42 is a small drum 46 and a clutch 47 is provided by which the drum 46 may be connected to be driven by the shaft 42. This drum 46 is provided with a cable 48 wound thereabout which passes over a pulley 49 and from thence over a pulley 50 and is provided with a hook 51. The hook 51 as shown in Fig. 8 comprises two arms 52 and 53. Pivotally mounted on the end of the arm 52 is a member 54 and a spring pressed latch member 55 on the arm 53 prevents the member 54 from being turned downwardly. The spring pressed latch 55 is operable by a bell crank 56 and a cable 57 which may be pulled to retract the latch 55 and allow the load to be dropped as will be readily understood. The yoke 26 is provided with a cross member 27 having inclined guideways 58 leading thereto and when the hook 51 is dropped over the cross member 27 the member 54 is turned upwardly on its pivot until the member 27 passes thereby at which time the member 54 will drop to the position shown in Fig. 8. and the yoke 26 and frame attached thereto may be lifted, the cross member 27 seating on the portion 59 of the member 54. By engaging or disengaging the clutch 47 shown in Fig. 4 the cable may be wound up or allowed to run free as desired. A reverse gear operated by a lever 101 is provided on the shaft of the internal combustion engine so that the different mechanisms driven by the engine may be reversed if desired. The pulleys 38 and 50 are rotatably mounted in the end of a crane comprising two side members 60 and 61 connected together by the brace members 62 and pivotally mounted on the draft machine at 63. This crane as shown in Fig. 3 may be connected to the upright 37 by a frame member 64 and when desired this member 64 may be removed to allow the crane to be moved on its pivot. The crane as shown in Figs. 3 and 4 is connected by means of cables 65 and 66 which pass over pulleys 67 and 68 on the upright 37 to the drums 69 and 70 on a shaft 71. This shaft 71 is provided with a bevel gear 72 on the end thereof meshing with the bevel gear 73 which may be rotated by means of a hand wheel 74 to take up or play out the cables 65 and 66 and thus move the crane. A clutch 75 is provided on the shaft 42 and is adapted upon operation to drive a sprocket 76 which is connected by means of a chain 77 to a sprocket on a beveled gear 78. This bevel gear 78 meshes with the bevel gear 79 on a vertical shaft 80 having a bevel gear 81 on the lower end thereof meshing with the bevel gear 82 on the drive shaft 83. By connecting or disconnecting the clutch 75 the drive wheels 84 may be driven or stopped at will and as shown in Fig. 4 the machine is provided with forward wheels 85 which are preferably provided with a steering mechanism not here shown. These wheels may be of the usual tractor type or may be connected by a caterpillar track or if desired may be made to ride on a track when the plowing operations are very extensive. These wheels support a subframe 86 on which a circular track 87 is mounted and on which a series of small wheels 88 are adapted to ride, the said wheels being prevented from coming off the track 87 by the shaft 80 which holds the platform and wheels in position over the subframe and track. This track 87 as shown in Fig. 5 is toothed on the interior and a drive gear 89 meshes with the said teeth. The drive gear 89 is connected by means of a vertical shaft 90 with a bevel gear 91 which meshes with a bevel gear 92 on the shaft 42 and the gear 92 may be connected or disconnected to the shaft 42 by means of a clutch 93 which may be thrown in to turn the upper part of the machine on the subframe as will be readily understood.

In operation the tank 94 is filled with gasoline and the parts are connected together as shown in Fig. 1. The cable 10 is of sufficient length so that the machines A and B may be set apart about 500 yards. In Fig. 10 I have shown a plan view of the field about 2500 yards long and 2000 yards wide and have laid out the field to show the manner in which it is plowed. The machines A and B are set in the position shown about 500 yards apart and the clutch 43 on the machine A is thrown into engagement to rotate the drum 35 thereon and wind up the cable as will be understood more particularly from Figs. 1 and 4. The reverse gear is brought into operation on the machine B by means of the lever 101 at this time and the clutch 43 is engaged to rotate the drum 35 in a reverse direction and feed out the cable to the plow, the two drums on the machines A and B rotating in opposite directions to continuously drive the cable 10 in one direction. By this arrangement, as will be understood from Fig. 1, the plow is drawn to the left of the Fig. 1 until it comes to the position beneath the hook 51 on the lifting frame of the machine A. This hook 51 is hooked over the cross member 27 of the plow frame and the plow is lifted from the ground the rollers 24 and 24$^a$ traveling to the top of the vertical slots 25 and 25$^a$ at this time, the clutches 43 on both machines being disengaged. The clutches 75 on both machines are brought to engagement to drive the machines A and B in the direction of the arrows shown in Fig. 1 to a distance equal to the width of the plow at which time the hook 51 is lowered to lower the plows and frame and the rollers 24 and 24$^a$ traveling down the angular slots 29 and 29$^a$ turn the plow frame a half turn so that the plows are headed toward the machine B. The clutch 43 on the machine B is then brought to engagement to rotate the drum 35 and draw the plow to the right of Fig. 1 and the rotation of the drum 35 on the machine A is reversed at this time to feed the cable to the plow. The plow is then lifted and the machines A and B are driven to a distance equal to the width of the plow and are again lowered, the plow being again given a half turn as will be readily understood. This operation continues until the machine B reaches a point C at the opposite side of the field and the machine A is driven in the direction of the arrows shown in Fig. 10 until it reaches the point D. During this movement of the machine A the machine B is reversed on its path of travel to keep the cable 10 between the machines tight and is again driven back to the point C as the machine A reaches the point D at which time the plowing continues as before until the entire field is plowed. As shown in Fig. 4 a clutch 95 is provided on the rear end of the engine shaft and may be engaged to drive the pulley 96. This pulley 96 is connected by a belt 97 to a pulley 98 on the shaft 99 by means of which a drum 100 may be rotated. This construction is used when the operator desires to draw the machine A or B by its own power and the cable on the drum 100 may be attached to a stout post or other firm object at some distance from the machine. The clutch 95 is then thrown into engagement to wind the cable on the drum and draw the machine as will be readily understood.

From the foregoing description it becomes evident that the device may be used for large plowing operations in which the size of the gang plow which may be drawn is limited only by the power of the machines A and B and by this construction a device is provided which accomplishes the objects described.

Having thus fully described my invention, its utility and mode of operation, what I claim and desire to secure by Letters Patent of the United States is—

1. In a cable operated plow, a pair of draft machines adapted to draw the plow therebetween each comprising a subframe provided with driving wheels, means for driving the wheels, a table rotatably mounted on each subframe, a drum rotatably mounted upon each table, means for rotating the table or drum independently, a subframe for the plow mounted on wheels, a cable connecting the two drums and being wound thereabout, the ends of the cable passing from the drums and being connected to the subframe of the plow, means carried by the plow for taking up the slack in the cable between the draft machines, a frame rotatably mounted on the subframe and carrying a series of plows, and means connecting the plow frame and subframe of the plow whereby raising of the plow frame and subsequent lowering thereof turns the same about on the subframe of the plow.

2. In a cable operated plow, a pair of draft machines for the plow each provided with a rotatable drum, means for rotating the drum, a subframe for the plow mounted on wheels, a cable connecting the two drums and being wound thereabout, the ends of the cable passing from the drums and being connected to the subframe of the plow, a frame supporting the plows carried by the subframe, a lifting mechanism carried by each draft machine adapted to lift the plows, and means whereby upon the plow being lifted and subsequently lowered the plow frame is given a half turn in relation to the subframe.

3. In a cable operated plow, a pair of draft machines adapted to draw the plow therebetween each comprising a subframe provided with driving wheels, means for driving the wheels, a table rotatably mounted on each subframe, a drum rotatably mounted on each table, means for rotating the table or drum independently, a subframe for the plow mounted on wheels, a cable connecting the two drums and being wound thereabout, the ends of the cable passing from the drums and being connected to the subframe of the plow, means carried by the plow for taking up the slack in the cable between the draft machines, and a frame mounted on the subframe and carrying a series of plows and disc harrows.

4. In a cable operated plow, a pair of draft machines adapted to draw the plow therebetween each comprising a subframe provided with driving wheels, means for driving the wheels, a table rotatably mounted on each subframe, a drum rotatably mounted on each table, means for rotating the table or the drum independently, a cable connecting the two drums and being wound thereabout and a plow between the draft machines to which the ends of the cable are connected.

5. In a cable operated plow, a pair of draft machines for the plow each provided with a rotatable drum, means for rotating each drum, a subframe for the plow mounted on wheels, a cable connecting the two drums and being wound thereabout, the ends of the cable passing from the drums and being connected to the subframe of the plow and a plow frame carried by the subframe and adapted to be turned about thereon for plowing in one direction or the other.

6. In a cable operated plow, a pair of draft machines adapted to draw the plow therebetween, means for propelling the draft machines, a drum rotatably mounted on each draft machine, means for rotating the drum, a cable connecting the two drums and being wound thereabout, a plow between the draft machines to which the ends of the cable are connected, and means carried by the plow for taking up the slack in the cable between the draft machines.

In testimony whereof, I sign this specification.

ARMANDO BERTELLA.